(12) United States Patent
Meng et al.

(10) Patent No.: US 12,511,054 B2
(45) Date of Patent: Dec. 30, 2025

(54) METHODS OF OPERATING MEMORY CONTROLLERS, DEVICES AND STORAGE MEDIA

(71) Applicant: Yangtze Memory Technologies Co., Ltd., Hubei (CN)

(72) Inventors: Xiangda Meng, Wuhan (CN); Xiang Chen, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/491,440

(22) Filed: Oct. 20, 2023

(65) Prior Publication Data
US 2025/0053305 A1 Feb. 13, 2025

(30) Foreign Application Priority Data
Aug. 9, 2023 (CN) .......................... 202311000879.5

(51) Int. Cl.
*G06F 12/00* (2006.01)
*G06F 3/06* (2006.01)

(52) U.S. Cl.
CPC ............ *G06F 3/0616* (2013.01); *G06F 3/064* (2013.01); *G06F 3/0659* (2013.01); *G06F 3/0679* (2013.01)

(58) Field of Classification Search
CPC ........ G06F 3/06; G06F 11/1446; G06F 12/00; G06F 3/0616; G06F 3/064; G06F 3/0659; G06F 3/0679
See application file for complete search history.

(56) References Cited

U.S. PATENT DOCUMENTS

| 2009/0119448 A1 | 5/2009 | Hsu et al. |
| 2010/0287328 A1 | 11/2010 | Feldman et al. |
| 2013/0346676 A1* | 12/2013 | Kim ................. G06F 12/0246 711/103 |

(Continued)

FOREIGN PATENT DOCUMENTS

| CN | 101354918 A | 1/2009 |
| CN | 111897485 A | 11/2020 |
| CN | 113900591 A | 1/2022 |

OTHER PUBLICATIONS

State Intellectual Property Office of the People's Republic of China, "First Examination Opinion Notice," Issued in connection with China application No. 202311000879.5, Sep. 16, 2025, 14 Pages. [English Language Machine Translated].

*Primary Examiner* — Arvind Talukdar
(74) *Attorney, Agent, or Firm* — Hanley, Flight & Zimmerman, LLC (57) ABSTRACT

Implementations of the present application disclose a method of operating a memory controller, a device and a storage medium. The controller is coupled to the memory, and the method includes: acquiring respective lifetimes of at least two partitions included in the memory, the lifetimes of the partitions being related to wear levels of the partitions; determining a target partition from the at least two partitions based on the respective lifetimes of the at least two partitions; and selecting a block from the target partition as a temporary block, the temporary block to store fragmented data. The above method avoids excessive wear to a certain fixed partition in the memory caused by setting the temporary block, thereby improving the service life of the memory.

20 Claims, 9 Drawing Sheets

(56) References Cited

U.S. PATENT DOCUMENTS

| | | | |
|---|---|---|---|
| 2016/0179430 A1* | 6/2016 | Kong | G06F 3/0604 |
| | | | 711/102 |
| 2017/0060425 A1* | 3/2017 | Sunata | G11C 16/10 |
| 2020/0264792 A1* | 8/2020 | Paley | G06F 3/0679 |

* cited by examiner

METHODS OF OPERATING MEMORY CONTROLLERS, DEVICES AND STORAGE MEDIA

REFERENCE TO RELATED APPLICATIONS

This application claims priority to and the benefit of Chinese Patent Application 202311000879.5, filed on Aug. 9, 2023, which is hereby incorporated by reference in its entirety.

TECHNICAL FIELD

Implementations of the present application relate to the field of storage technologies, and in particular, to a method of operating a memory controller, a device, and a storage medium.

BACKGROUND

A temporary block is a block selected from multiple blocks included in a memory and configured to store fragmented data temporarily.

The memory may be divided into at least two partitions, and a block may be selected from a certain fixed partition of the at least two partitions as the temporary block. When fragmented data needs to be written, the fragmented data will be written into the temporary block first, and then after a certain amount of data is stored in the temporary block, valid data in the temporary block will be moved into a current block of the memory for storage.

DETAILED DESCRIPTION

In order to make the objects, technical solutions and advantages of the present application clearer, the implementations of the present application will be further described in detail below in conjunction with the accompanying drawings.

The above-mentioned method of selecting a temporary block from a certain fixed partition will cause uneven wear of individual partitions of the memory, which will affect the service life of the memory.

Figure 1:
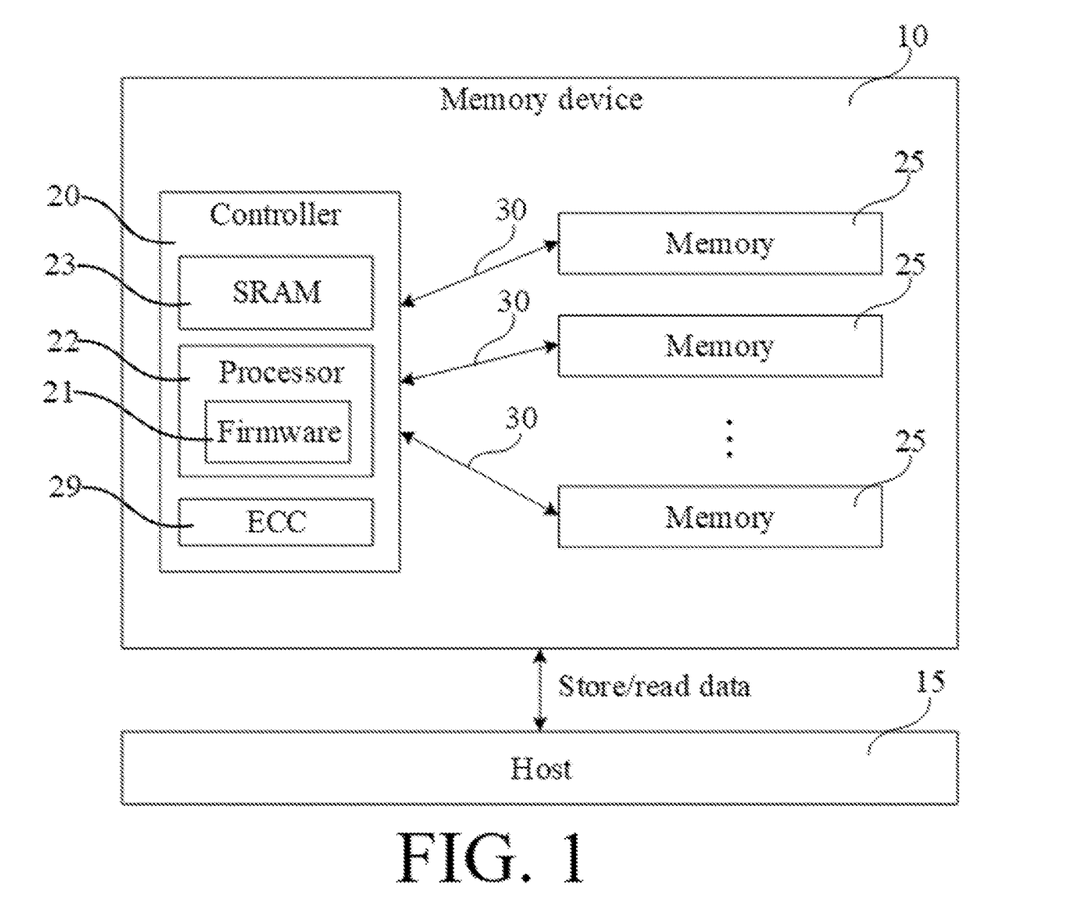
FIG. 1 is a block diagram of a system with a memory device according to an implementation of the present application.

With reference to FIG. 1, it shows a block diagram of a system with a memory device 10 according to an implementation of the present application. In some implementations, the system can be mobile phone, desktop computer, laptop computer, tablet computer, vehicle computer, game console, printer, positioning device, wearable electronic device, smart sensor, Virtual Reality (VR) devices, Augmented Reality (AR) devices, or any other suitable electronic device having storage device therein. The memory device 10 (e.g., a NAND memory device) may include a controller 20 and one or more semiconductor memories 25. Each semiconductor memory 25 (hereinafter simply referred to as "memory") may be a Flash memory (for example, NAND flash memory, NOR flash memory, etc.). The memory device 10 may communicate with a host 15 via the controller 20, which may be connected to one or more memories 25 via one or more memory channels 30. In some implementations, each memory 25 may be managed by controller 20 via one or more memory channels 30.

In some implementations, the host 15 may include a processor of an electronic device, such as a Central Processing Unit (CPU), or a System on Chip (SoC), such as an Application Processor (AP). The host 15 may send data to be stored in the memory system 10 and/or may retrieve data stored in the memory device 10.

In some implementations, the controller 20 may process Input/Output (I/O) requests received from the host 15, ensure data integrity and efficient storage, and manage the memory 25. To perform these tasks, the controller 20 may run firmware 21, which may be executed by one or more processors 22 (e.g., microcontroller units, CPUs) of the controller 20. For example, the controller 20 may run the firmware 21 to map logical addresses (e.g., addresses used by the host associated with host data) to physical addresses in the memory 25 (e.g., the actual location where the data is stored). The controller 20 also runs firmware 21 to manage defective memory blocks in memory 25. The firmware 21 can remap logical addresses to different physical addresses, i.e., moving data to different physical addresses. The controller 20 also includes an internal memory 23 (for example, DRAM, SRAM, EPROM, etc., among which only SRAM is used in FIG. 1 as an example of the internal memory for illustration), and the internal memory 23 can be used to store various metadata used by the firmware 21. In some implementations, the controller 20 can also perform error recovery through an Error Correction Code (ECC) engine 29. ECC is used to detect and correct raw bit errors that occur within each memory 25.

In some implementations, memory channel 30 may provide data and control communication between controller 20 and each memory 25 via a data bus. The controller 20 can select a certain memory 25 according to the chip enable signal.

Figure 2:
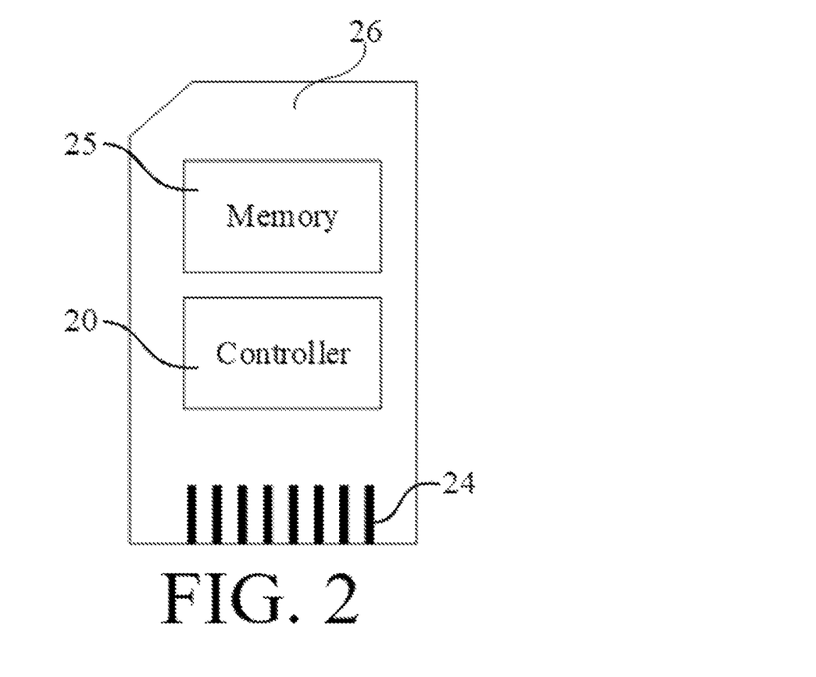
FIG. 2 is a schematic diagram of a memory card according to an implementation of the present application.
Figure 3:
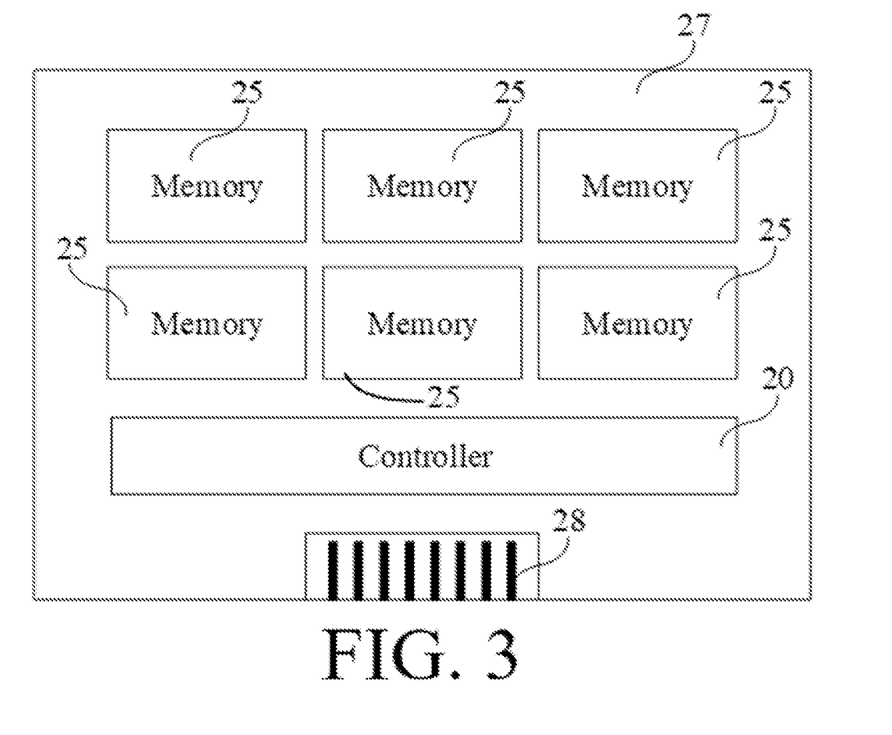
FIG. 3 is a schematic diagram of a solid state drive according to an implementation of the present application.

In some implementations, the controller 20 and one or more memories 25 may be integrated into various types of memory devices, for example, included in the same package, such as a Universal Flash Storage (UFS) package or an embedded Multi Media Car (eMMC) package. That is, the memory device 10 can be implemented and packaged into different types of terminal electronic products. In one example as shown in FIG. 2, controller 20 and single memory 25 may be integrated into memory card 26. Memory card 26 may include PC (PCMCIA, Personal Computer Memory Card International Association) card, Compact Flash (CF) card, Smart Media (SM) card, memory stick, multimedia card (MMC, RS-MMC, MMCmicro), SD card (SD, miniSD, microSD, SDHC), UFS, etc. Memory card 26 may also include a memory card connector 24 that couples memory card 26 with a host (e.g., host 15 in FIG. 1). In another example shown in FIG. 3, the controller 20 and multiple memories 25 may be integrated into a Solid State Drive (SSD) 27. SSD 27 may also include SSD connector 28 that couples SSD 27 to a host (e.g., the host 15 in FIG. 1).

The above-mentioned memory device 10 may be one or more of a universal flash memory, an embedded multimedia card, a UFS-based Multichip Package (uMCP) memory, an eMMC-based Multichip Package (eMCP) memory, solid state drives and the like, which is not limited in this application.

Figure 4:
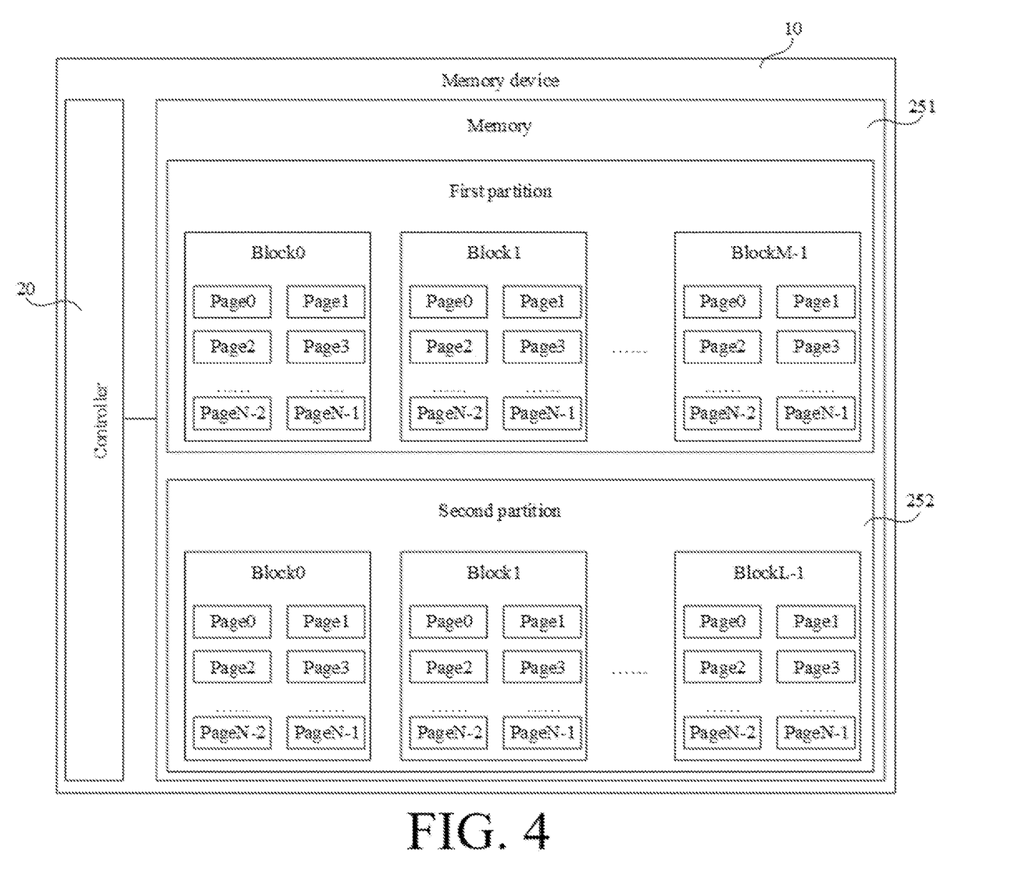
FIG. 4 is a schematic diagram of a partition structure of a memory according to an implementation of the present application.

In some implementations, as shown in FIG. 4, the memory 25 in the memory device 10 includes at least a first partition 251 and a second partition 252. And the first partition 251 may include one or more of a Single-Level Cell (SLC) storage area, a Fast Not AND (Fast NAND) memory, a Phase-Change Memory (PCM), 3D stacked phase-change memory X3D, and the second partition 252 may include one or more of an SLC storage area, an Multi-Level Cell (MLC) storage area, a Trinary-Level Cell (TLC) storage area, Quad-Level Cell (QLC) storage area, and Penta-Level Cell (PLC) storage area. Further, the memory device 10 may also include other storage media such as a Hard Disk Drive (HDD) and the like.

In some implementations, the storage modes of the first partition 251 and the second partition 252 are different. For example, the first partition 251 is an SLC flash memory, and the second partition 252 is an MLC or TLC flash memory. As shown in FIG. 4, the first partition 251 may include M blocks, each block includes N pages, and each page contains a certain number of cells. All the cells in all the pages in all the blocks in the first partition 251 are single-level cells (SLCs). As such, the first partition 251 forms an SLC-type storage area. Similarly, the second partition 252 may include L blocks, each block includes N pages (here the number may also not be N), and each page contains a certain number of cells. All the cells in all the pages in all the blocks in the second partition 252 are multi-level cells (MLCs) or trinary-level cells (TLCs). As such, the second storage area 1032 forms an MLC/TLC-type storage area. And the erasing performance of SLC and MLC is similar, and the read performance (including read speed), write performance (including write speed), storage performance (including storage lifetime), etc. of SLC flash memory are better than those of MLC/TLC flash memory. Under the above circumstances, therefore, the read/write performance, storage performance, etc. of the first partition 251 are all better than those of the second partition 252.

In other implementations, the storage modes of the first partition 251 and the second partition 252 are the same. For example, the first partition 251 and the second partition 252 can both be MLC or TLC flash memory. At this time, the blocks in part of the MLC or TLC flash memory can be converted into SLC mode to improve the read and write performance of flash memory. The reason is that the difference between MLC/TLC and SLC is how many bits of data a cell stores. TLC stores three bits, MLC stores two bits, and SLC stores one bit. To convert MLC into SLC mode is to use only one of the two bits, i.e., the least significant bit (LSB). Similarly, the principle of converting TLC into SLC mode is the same, wherein only the LSB of the three bits is used. Of course, not using the other one or two bits means that the other half or two-thirds of the capacity is left unused. Therefore, after the MLC is converted into the SLC mode, the capacity is only half of the original MLC, and after the TLC is converted into the SLC mode, the capacity is only one-third of the original TLC.

Figure 5:
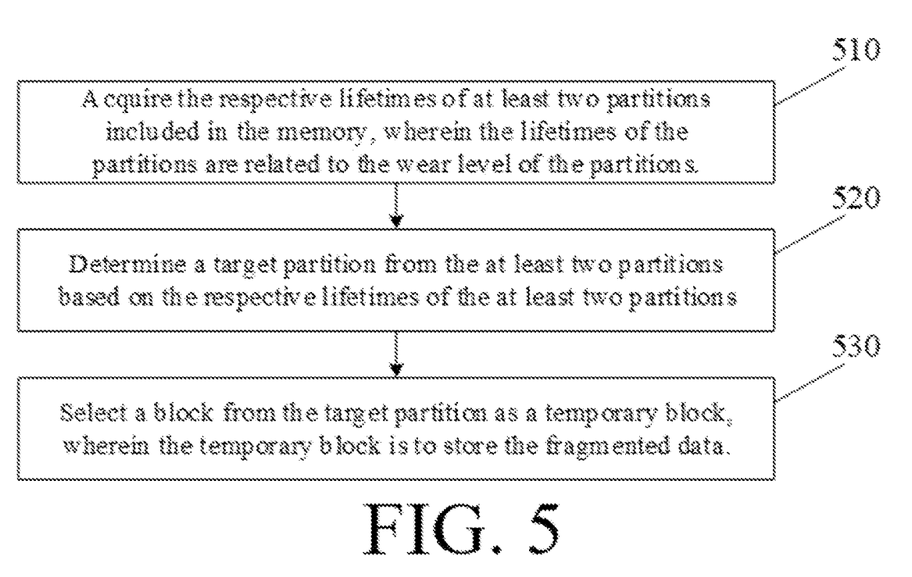
FIG. 5 is a flowchart of a method of operating a memory controller according to an implementation of the present application.

Referring to FIG. 5, which shows a flowchart of a method of operating a memory controller according to an implementation of the present application. The execution subject of each operation of the method may be the memory device 10 in the above implementations, and further, the execution subject of each operation of the method may be the controller 20 in the memory device 10. The aforementioned controller is coupled to the memory. The method may include at least one of the following operations 510-530.

In operation 510, the respective lifetimes of at least two partitions included in the memory are acquired, wherein the lifetimes of the partitions are related to the wear levels of the partitions.

In the implementation of the present application, the memory may be Not AND Flash (NAND Flash), Not OR Flash (NOR Flash), or other semiconductor memories. In the following implementations, for convenience of description, the NAND flash memory is taken as an example of the above-mentioned memory.

A memory may include more than two partitions, or only two partitions. In some implementations, technicians can divide the memory into two or more partitions depending on the type of stored data, or the performance requirements for the memory (such as the requirements for data read and write performance, and the requirements for storage lifetime). As an example, at least two partitions included in the memory may be the first partition 251 and the second partition 252. Further, the first partition 251 may be Enhanced User Data Area (EUDA) for storing relatively important data such as system blocks, Bad-Block Table (BBT) and logic-to-physical mapping table (L2P mapping table), and the second partition 252 may be User Data Area (UDA).

In some implementations, at least two partitions are divided based on the storage mode adopted by individual blocks in the memory. For example, if the storage mode adopted by individual blocks in a certain partition is all SLC mode, the partition is an SLC partition. If the storage mode adopted by individual blocks in a certain partition is TLC mode, the partition is a TLC partition. If some blocks in a certain partition adopt TLC mode and some blocks adopt MLC mode, the partition is an MLC/TLC partition.

For example, EUDA can be written with data in SLC mode, and UDA can be written with data in a hybrid mode including SLC and other modes. The specific selection of other modes is determined by the design of the memory cell, and may include MLC, TLC, QLC, and other modes.

The lifetime of a partition refers to the erase/write lifetime of the partition, which can be characterized by the ratio of the erased and written times of the partition to a maximum erasure and write times. Generally, the smaller the ratio of the erased and written times of the partition to a maximum erasure and write times, the lower the wear level of the partition, indicating that the partition is "younger", that is, the lifetime of the partition is smaller.

In addition, it should be noted that the maximum erasure and write times of blocks using different storage modes in individual partitions is different. For example, the maximum erasure and write times of a block written with data in SLC mode is about 100,000 times, the maximum erasure and write times of a block written with data in MLC mode is about 3,000-10,000 times, and the maximum erasure and write times of a block written with data in TLC mode is about 3,000 times.

Therefore, in some implementations, for any partition in at least two partitions, the mean of the maximum erasure and write times of all blocks in the partition can be determined as the maximum erasure and write times of the partition, and the mean of the erased and written times of all blocks of the partition can be similarly determined as the erased and written times of the partition. As an example, if a certain partition contains three blocks, the maximum erasure and write times of the three blocks are 3,000, 4,000, and 8,000 times respectively, and the erased and written times of the three blocks are 2,000, 1,000, and 6,000 times respectively, then the maximum erasure and write times of the partition can be determined as 5,000 times, and the erased and written times of the partition can be determined as 3,000 times.

In addition, in some implementations, when determining the maximum erase and write times or the erased and written times of a partition, the median or the mode value of the maximum erase and write times or the erased and written times of all blocks in the partition can also be determined as the maximum erase and write times or the erased and written times of the partition. Further, when calculating the above mean, median or mode values, the estimated values of individual blocks can also be used for calculation. For example, 6,400 times are estimated as 6,000 times, and 6,600 times are estimated as 7,000 times. The present application makes no limitation on how to determine the lifetimes of various partitions and the corresponding calculation method.

The erased and written times and the maximum erase and write times of individual blocks in the memory may be stored in a memory coupled to the controller, or stored in a memory inside the controller, which is not limited in the present application.

In operation 520, a target partition from the at least two partitions is determined based on the respective lifetimes of the at least two partitions.

The target partition refers to a partition among at least two partitions, in which a temporary block is selected.

In some implementations, a partition whose lifetime satisfies a condition among the at least two partitions is determined as the target partition.

As an example, the partition whose lifetime satisfies the condition may refer to a partition whose ratio of the erased and written times to the maximum erase and write times is less than a preset value of the ratio. Alternatively, the partition whose lifetime satisfies the condition may refer to a partition which has the largest difference between the maximum erase and write times and the erased and written times. Yet alternatively, the partition whose lifetime satisfies the condition may refer to a partition which has the difference between the maximum erase and write times and the erased and written times that is greater than a preset value of the difference.

The aforementioned preset value of the ratio and preset value of the difference can be preset by technicians according to the type of flash memory or storage mode. For example, the preset value of the ratio may be 0.5, and the preset value of the difference may be 3,000. And if the preset value of the ratio is 0.5, one partition among the partitions whose ratio of the erased and written times to the maximum erase and write times is less than the preset value of the ratio can be arbitrarily selected as the target partition. If the preset value of the difference is 3,000, one partition among the partitions which have the difference between the erased and written times and the maximum erase and write times that is greater than the preset value of the difference can be arbitrarily selected as the target partition.

In some implementations, a partition with the smallest lifetime among the at least two partitions is determined as the target partition.

In some implementations, the partition with the smallest lifetime among the at least two partitions refers to the partition with a ratio of the erased and written times to the maximum erase and write times is the smallest among the at least two partitions, that is, the "youngest" partition. As an example, if at least two partitions are the first partition and the second partition, the maximum erase and write times of the first partition is 5,000 times, the erased and written times of the first partition is 3,000 times, the maximum erase and write times of the second partition is 1,000 times, and the erased and written times of the second partition is 900 times. Although the erased and written times of the first partition is greater than the maximum erase and write times of the second partition, it can be considered that the lifetime of the first partition is shorter than the lifetime of the second partition because the ratio of the erased and written times of the first partition to the maximum erase and write times of the first partition is greater than that of the second partition. Therefore, in the above case, the first partition is determined as the target partition.

If at least two partitions are UDA and EUDA, UDA is generally used as the target partition. However, UDA partitions often use the hybrid mode including SLC and other modes to write data, and other modes such as TLC mode cause much greater loss of lifetime of the partition than SLC mode. Therefore, only using UDA as the target partition will cause excessive wear of UDA. When only using the EUDA partition as the target partition, since EUDA has stored system data of a large amount of firmware, selection of a temporary block therefrom to store fragmented data is prone to excessive loss of the lifetime of EUDA, resulting in a waste of UDA lifetime.

Figure 6:
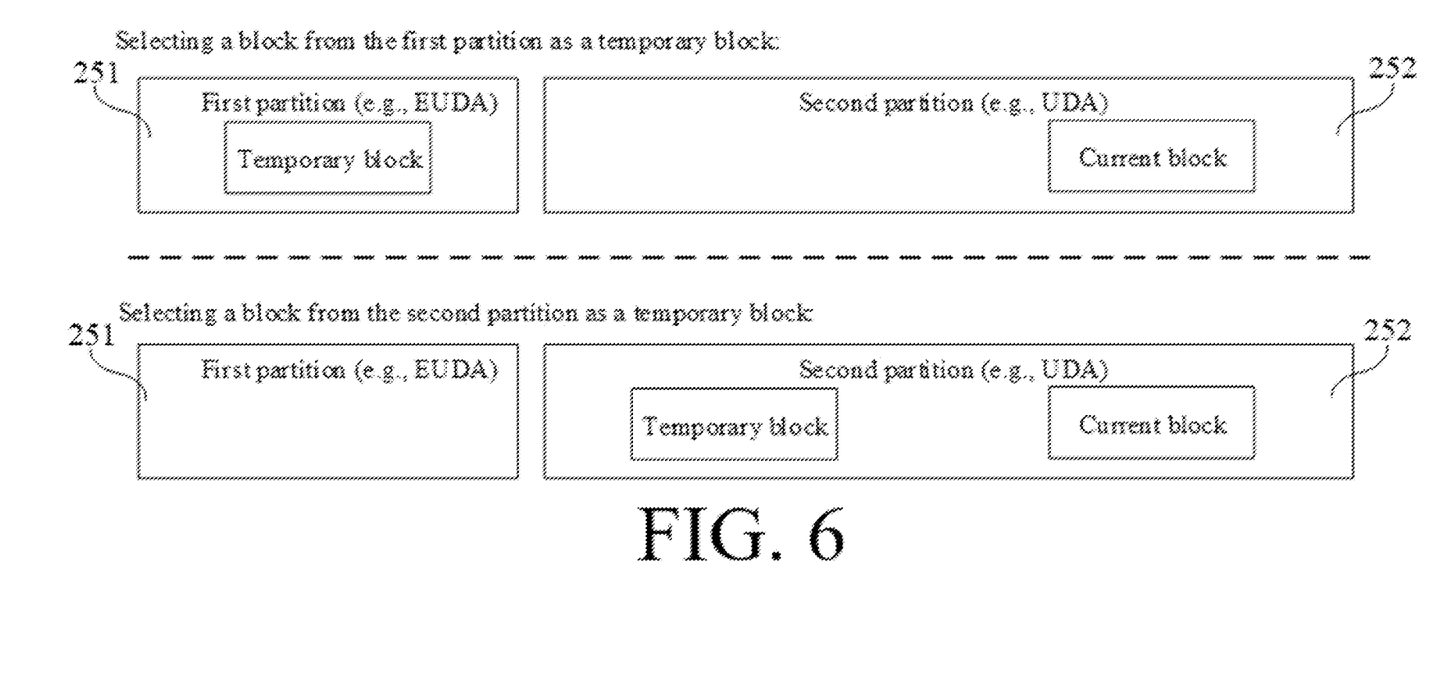
FIG. 6 is a schematic diagram illustrating selection of a temporary block according to an implementation of the present application.

In the implementation of the present application, the target partition can be flexibly selected according to the life consumption of individual partitions in the at least two partitions, so as to avoid excessive wear caused by continuously using a certain fixed partition as the target partition. As an example, as shown in FIG. 6, if at least two partitions are a first partition 251 (such as EUDA) and a second partition 252 (such as UDA), when the lifetime of the first partition 251 is shorter than that of the second partition 252, the first partition 251 can be determined as the target partition, and a temporary block can be selected therefrom; and when the lifetime of the second partition 252 is shorter than the first partition 251, the second partition 252 can be determined as the target partition, and a temporary block can be selected therefrom.

In operation 530, a block is selected from the target partition as a temporary block, wherein the temporary block is to store the fragmented data.

It should be noted that, in NAND flash memory, a block is the smallest unit of erasing, and a page is the smallest addressing unit, that is, the smallest unit of reading and writing. The number of pages in a block is different depending on different specifications of different manufacturers, and the sizes of the pages themselves are also different. For example, there are 1024 pages in a block, and the size of each page is (16 KB+2208B), among which, 16 KB is allocated as a data area to store data, and 2208B is allocated as a metadata area to store metadata. For instance, 16 KB is used to store one or more target data in the present application, and 2208B is used to store the data type identification respectively corresponding to one or more target data.

Fragmented data refers to data that wastes storage space when stored separately. In the above examples, for the target data to be stored in the data area, if the size of the target data cannot fill up the data area, that is, the target data is smaller than 16 KB, then the target data can be regarded as fragmented data. In addition, if the size of the target data is greater than 16 KB, for example, when the target data is 18 KB, after a page of target data of 16 KB is written, the remaining target data of 2 KB can also be regarded as fragmented data.

In addition, it is to be explained that due to the storage principle of NAND flash memory, writing data to NAND flash memory can only change the data (bit) from 1 to 0, while erasing can only change all data from 0 to 1. Therefore, in NAND flash memory, to modify or rewrite data, it must be written into a free page that has been erased or has not been written, otherwise the data will be disordered. Then, it is obvious that if every time fragmented data is written, it is written into a different page and stored for a long time, which may waste the storage space in each page except the space occupied by the fragmented data and result in fewer and fewer free pages.

In addition, when new data is to be written or data is to be modified, if there are no enough free pages, a Garbage Collection (GC) process needs to be performed to merge and move the valid data that needs to be saved in one or more blocks with data written to other blocks, and then after erasing one or more of the above blocks, new data or modified data is written thereinto. It can be seen that when there are insufficient free pages, whenever data is to be written, the actually written data includes not only the written new data or modified data, but also the merged and moved data, resulting in write amplification (simply referred to as WA) phenomenon. Therefore, it is desired to set a temporary block in the memory to store and accumulate fragmented data.

Write amplification refers to an undesirable phenomenon in flash memory and solid state drives, that is, the amount of physical data actually written is many times the amount of data written by the user.

In some implementations, one block among the individual blocks in the target partition may be arbitrarily selected as the temporary block.

Alternatively, in other implementations, operation 530 may include at least one of the following two sub-operations:

1. The lifetimes of individual blocks included in the target partition are acquired, wherein the lifetimes of the blocks are related to the wear levels of the blocks.

In some implementations, the storage mode for individual blocks included in the target partition is the same (for example, individual blocks all adopt the SLC mode), or the maximum erase and write times of individual blocks are the same. At this time, the lifetime of individual blocks can be directly represented by the erased and written times of individual blocks.

In some other implementations, the storage modes for the individual blocks included in the target partition are different (for example, the target partition adopts the hybrid SLC/TLC mode), or the maximum erase and write times of individual block are different. At this time, the lifetime of individual blocks can be represented by the erased and written times and the maximum erase and write times of individual blocks. Generally, the smaller the ratio of the erased and written times to the maximum erase and write times of a block, the lower the wear level of the block, indicating that the block is "younger", that is, the lifetime of the block is smaller.

2. A block whose lifetime satisfies a condition among the individual blocks included in the target partition is determined as the temporary block.

In some implementations, a block with the smallest lifetime among the individual blocks included in the target partition is used as the temporary block.

In some other implementations, any block whose lifetime is smaller than a preset value among the individual blocks included in the target partition is used as the temporary block.

In some implementations, the storage modes for the individual blocks included in the target partition are the same, or the maximum erasure and write times of the individual blocks are the same. At this time, a block whose lifetime satisfies the condition may refer to the block with the smallest erased and written times among the individual blocks included in the target partition. Alternatively, a block whose lifetime satisfies the condition may refer to a block whose erased and written times is less than a preset value. The preset value can be preset by technicians according to the type of flash memory or the storage mode. For example, if the preset value is 1,000, then one block can be arbitrarily selected from all blocks whose erased and written times are less than 1,000 times as a temporary block. Further, if there is one or more blocks with a particularly small erased and written times in the blocks whose erased and written times are less than the preset value, one block of the one or more blocks may be arbitrarily selected as a temporary block. For example, if the preset value is 1,000, and there are 5 blocks whose erased and written times are less than 1,000, among which 3 blocks have erased and written times of about 900 times, and two blocks have erased and written times of about 10, one of these two blocks may be arbitrarily selected as the temporary block.

In some implementations, the storage modes for the individual blocks included in the target partition are different, or the maximum erase and write times of the individual blocks are different. At this time, a block whose lifetime satisfies the condition may refer to the block with the smallest ratio of the erased and written times to the maximum erase and write times among the individual blocks included in the target partition. Alternatively, a block whose lifetime satisfies the condition may refer to the block whose ratio of the erased and written times to the maximum erase and write times is less than the first preset value. Yet alternatively, a block whose lifetime satisfies the condition may refer to the block which has the largest difference between the maximum erase and write times and the erased and written times. Still alternatively, a block whose lifetime satisfies the condition may refer to the block which has the difference between the maximum erase and write times and the erased and written times that is greater than a second preset value. The above-mentioned first preset value and second preset value can also be preset by technicians according to the type or storage mode of the flash memory. For example, the first preset value may be 0.5, and the second preset value may be 3,000. For the specific selection process of the temporary block, reference may be made to the above implementations, which will not be repeated here.

In accordance with the above method, the temporary block is selected based on the lifetime of individual blocks included in the target partition, which avoids excessive wear to a certain fixed block and further improves the service life of the memory.

In some implementations, SLC mode is adopted to write data into the temporary block.

It can be seen from the above implementations that after adopting the SLC mode to write data into the temporary block, one bit of data is stored in one page of the temporary block, and the SLC mode corresponds to a larger maximum erase and write times and better read and write performance. Therefore, using the above-mentioned method can improve the data read and write performance of the temporary block, thereby improving the efficiency of subsequent data movement and reducing partition wear.

In some implementations, when stored data in the temporary block reaches a set amount, the set amount of stored data is written into a current block of at least one memory. The current block is used for storing non-fragmented data.

The stored data reaching the set amount may refer to the stored data reaching the data amount of non-fragmented data. Non-fragmented data refers to data that does not waste storage space when stored separately. As an example, if the size of the data area of each page in the current block is 16 KB, the above-mentioned set amount can be set to 16 KB. That is, each time the stored data in the temporary block fills up the size of 16 KB, the stored data of 16 KB is written into the current block.

In some implementations, when the valid data to be saved in the stored data reaches a set amount, the set amount of valid data is written into the current block of at least one memory. As an example, when the set amount is 16 KB, if the stored data in the temporary block reaches 18 KB, and the stored data just contains 16 KB of valid data, then the valid data of 16 KB is written into the current block.

In addition, it should be noted that the above selection of the set amount is only an example, and those skilled in the art can also set the maximum data amount that can be stored in the current block or the maximum data amount that can be stored in multiple pages in the current block as the set amount, which is not limited in the present application.

Moreover, it should be noted that if there is only one memory in the memory device, as shown in FIG. 6, the current block and the temporary block may be located in the same partition or in different partitions, which is not limited in the present application.

In accordance with the above method, the fragmented data is accumulated in the temporary block, and the non-fragmented data is written into the current block, which reduces the waste of storage space, increases the number of free pages, and reduces write amplification.

Figure 7:
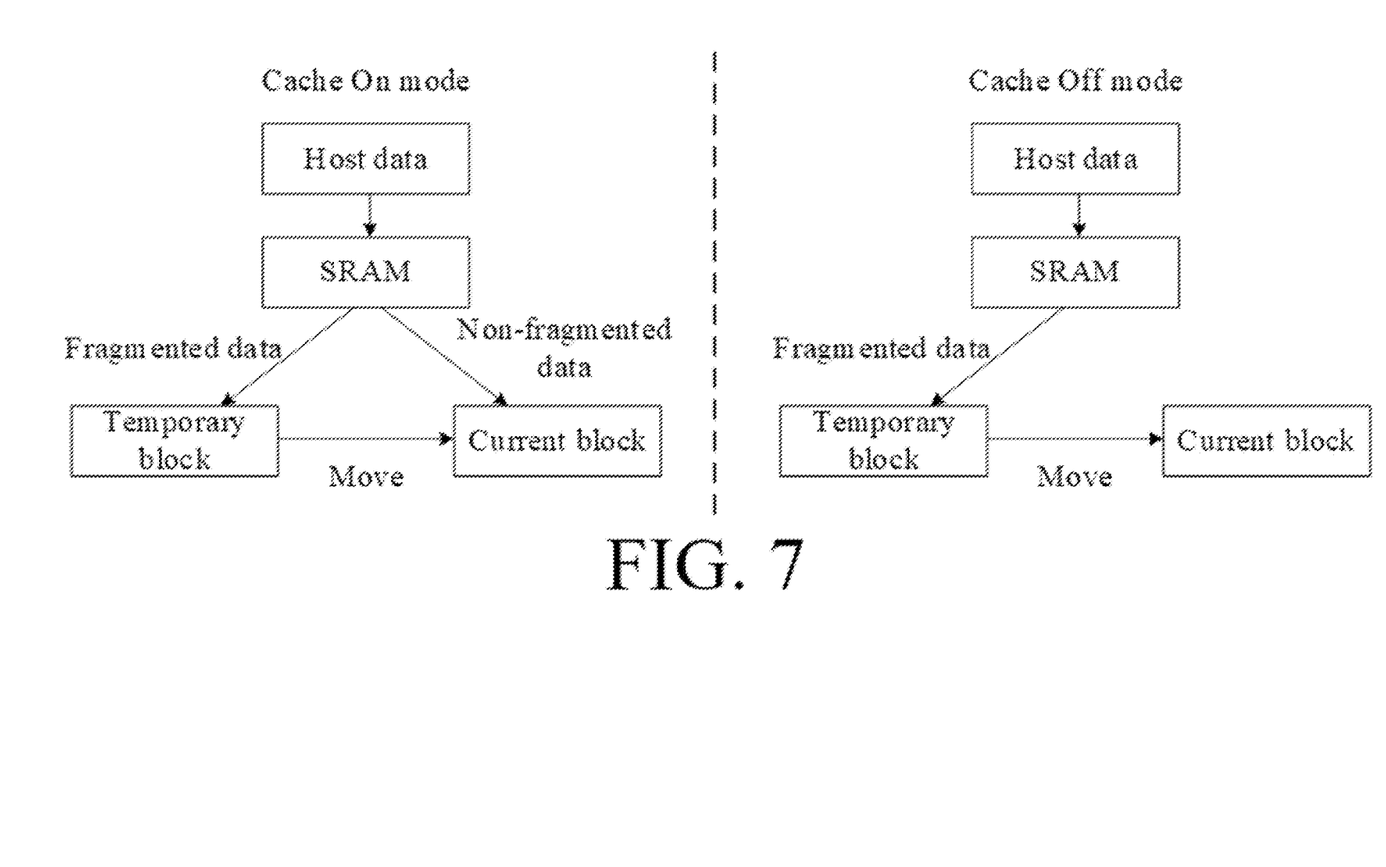
FIG. 7 is a schematic diagram illustrating two different data accumulation and movement modes according to an implementation of the present application.

In some implementations, as shown in FIG. 7, the non-fragmented data can be written into the current block in the Cache On mode or the Cache Off mode.

In the following, the above two modes will be described by taking Static Random-Access Memory (SRAM) as an example of the internal memory in the controller.

In Cache Off mode, after the host data is stored in the SRAM in the controller, the SRAM will temporarily store all the data in the temporary block for data accumulation, and the non-fragmented data in the current block is only moved from the temporary block. In this mode, the burden of using temporary blocks is relatively large.

In Cache On mode, after the host data is stored in the SRAM in the controller, on the one hand, the SRAM will temporarily store some data in temporary blocks for data accumulation, and on the other hand, the SRAM itself will also perform data accumulation. Therefore, in this mode, the non-fragmented data in the current block comes from both the temporary block and the SRAM.

Both of the above two modes use temporary blocks to accumulate fragmented data. Therefore, when applying the above two modes for data writing, the method of operating the memory controller provided by the implementation of the present application can be adopted to select the temporary block.

In some implementations, the temporary block may be erased after multiple data writes are performed on the current block, or when the stored data in the temporary block reaches an set amount to erase. In addition, in the implementation of the present application, when calculating whether the stored data in the temporary block reaches the set amount, the data amount of the data already written into the current block in the temporary block is not calculated.

As an example, if the set amount is 16 KB, and the set amount to erase is 64 KB, when the stored data in the temporary block is accumulated to 16 KB, 32 KB, 48 KB, and 64 KB respectively, each newly accumulated 16 KB data can be written into the current block, and when the stored data in the temporary block has accumulated to 64 KB, the temporary block can be erased if it has been confirmed that the data writing to the current block has been completed.

In addition, it should be noted that the above-mentioned selection of the set amount to erase is only an example illustration, and those skilled in the art can also directly set the set amount to erase as the above-mentioned set amount, or set the maximum amount of data that can be stored in the temporary block as the set amount to erase.

Referring to FIG. 1, in a memory device, there may be multiple memories. At this time, if a temporary block is set for each memory when data is written. Obviously, unnecessary loss of chip lifetime will be caused. Therefore, one temporary block can be utilized to accumulate data for multiple current blocks in multiple memories. Reference may be made to the following examples for details.

In some implementations, the above-mentioned set amount is related to the quantity of memory.

In some implementations, the memory is multiple memories.

As an example, if the memory device has 4 memories, and the size of the data area of each page in the current block in each memory is 16 KB, the above-mentioned set amount can be set as 64 KB.

In some implementations, after the set amount of stored data is evenly divided, it is written into current blocks of multiple memories.

Continuing with the above example, when the set amount is 64 KB, the stored data up to 64 KB can be evenly divided into four 16 KB of stored data, which are respectively written into the current blocks of the above four blocks of memories.

In addition, it should be noted that, in the above examples, the size of data that can be stored in each page of the current blocks in multiple memories may also be different. The set amount may be the sum of the maximum amount of stored data respectively corresponding to each page of the multiple current blocks described above. For example, if in the above example, the size of the data area of each page in the current blocks in the 4 memories is 8 KB, 16 KB, 32 KB, and 64 KB respectively, the set amount can be set as 120 KB. Correspondingly, when dividing the set amount of stored data, corresponding division should also be performed according to the sizes of the above-mentioned data areas.

The above method uses one temporary block to accumulate data for multiple current blocks in multiple memories, which avoids unnecessary lifetime loss while making full use of the storage space of multiple memories.

In the technical solution provided by the implementation of the present application, a target partition is determined from at least two partitions included in the memory according to the respective lifetimes of the at least two partitions, and a temporary block for storing fragmented data is selected from the target partition. Excessive wear to a certain fixed partition in the memory caused by setting the temporary block is avoided, thereby improving the service life of the memory.

When the memory device is in use, Total Bytes Writen (TBW) of the memory device is promised to the user. However, in some specific application scenarios of some users, the write amplification is extremely large, resulting in the actual TBW failing to meet promised TBW. However, the technical solution provided by the implementation of the present application, due to its full and balanced use of the storage space in the memory and improvements to the service life of the memory, can meet needs of reducing the Write Amplification Factor (WAF) and increasing TBW in the actual application scenarios.

Referring to Table 1, which shows the changes of the actual WAF and TWB of the product after the technical solutions provided by the implementations of the present application are applied to eMMC.

TABLE 1

| Model used | Packaging density | WAF/TBW Before improvement | WAF/TBW After improvement | TBW increase |
|---|---|---|---|---|
| K model | Single-chip package | 3.45/61.9 | 3.26/65.3 | 5% |
|  | Dual-chip package | 2.35/181 | 2.3/183 | 1% |
|  | Four-chip package | 1.91/467 | 1.89/453 | −3% |
| O model | Single-chip package | 2.57/81.3 | 2.14/112 | 38% |
|  | Dual-chip package | 3.49/120 | 3.11/146 | 22% |
|  | Four-chip package | 3.79/229 | 3.34/287 | 25% |
| V model | Single-chip package | 3.19/65 | 2.7/83 | 28% |
|  | Dual-chip package | 3.21/130 | 2.79/174 | 33% |
|  | Four-chip package | 3.72/228 | 3.16/289 | 27% |
| S model | Single-chip package | 12.6/21.1 | 6.11/40 | 89% |

The above-mentioned K model, O model, V model, and S model respectively correspond to usage scenarios of different users. Single-chip package, dual-chip package, and four-chip package respectively represent different numbers of memories included in products in different packages. For example, dual-chip package means that the product includes two memories. WAF is the ratio of the amount of physical data actually written to the amount of data written by the user. It can be seen that adopting the technical solution provided by the implementation of this application in most application scenarios allows effective reduction of the WAF of the product and improvement to the TWB of the product.

Figure 8:
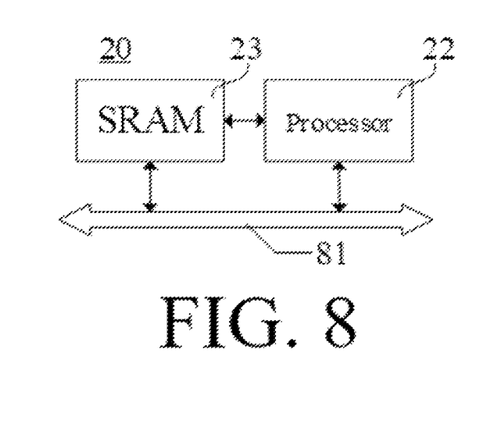
FIG. 8 is a structural block diagram of a controller according to an implementation of the present application.

Referring to FIG. 8, which schematically shows a structural block diagram of a controller according to an implementation of the present application.

The controller 20 includes an internal memory 23, and a processor 22 coupled to the internal memory 23. The processor 22 can be used to run firmware to implement the above-mentioned method of operating the memory controller. The internal memory 23 may be used to store metadata used by the firmware.

An internal memory 23 is also called an internal memory device and a main memory, and is used to temporarily store computing data of the processor 22 (for example, a micro-controller unit, CPU) and data exchanged with an external memory (for example, a HDD). Optionally, an internal memory 23 may include Read-Only Memory (ROM), Random-Access Memory (RAM) and cache. The SRAM is taken as as an example of the internal memory 23 in FIG. 8 for illustration.

Data transfer is carried out between the internal memory 23 and the processor 22 via a databus 81, and data exchange with external devices is enabled. As an example, when performing data storage, the host data (not shown in FIG. 8) is temporarily stored into the internal memory 23 via the data bus 81 first, then the temporarily stored host data in the internal memory 23 is allocated by the processor 22, and finally stored in a memory (not shown in FIG. 8) coupled to the controller 20. It can be seen that in the process of storing the host data into the memory, the controller 20 plays the role of allocation and bridging.

In some implementations, a memory device is further provided, and the memory device may include a controller and at least one memory. The controller can be configured to run firmware to implement the method of operating the memory controller as described above.

Figure 9:
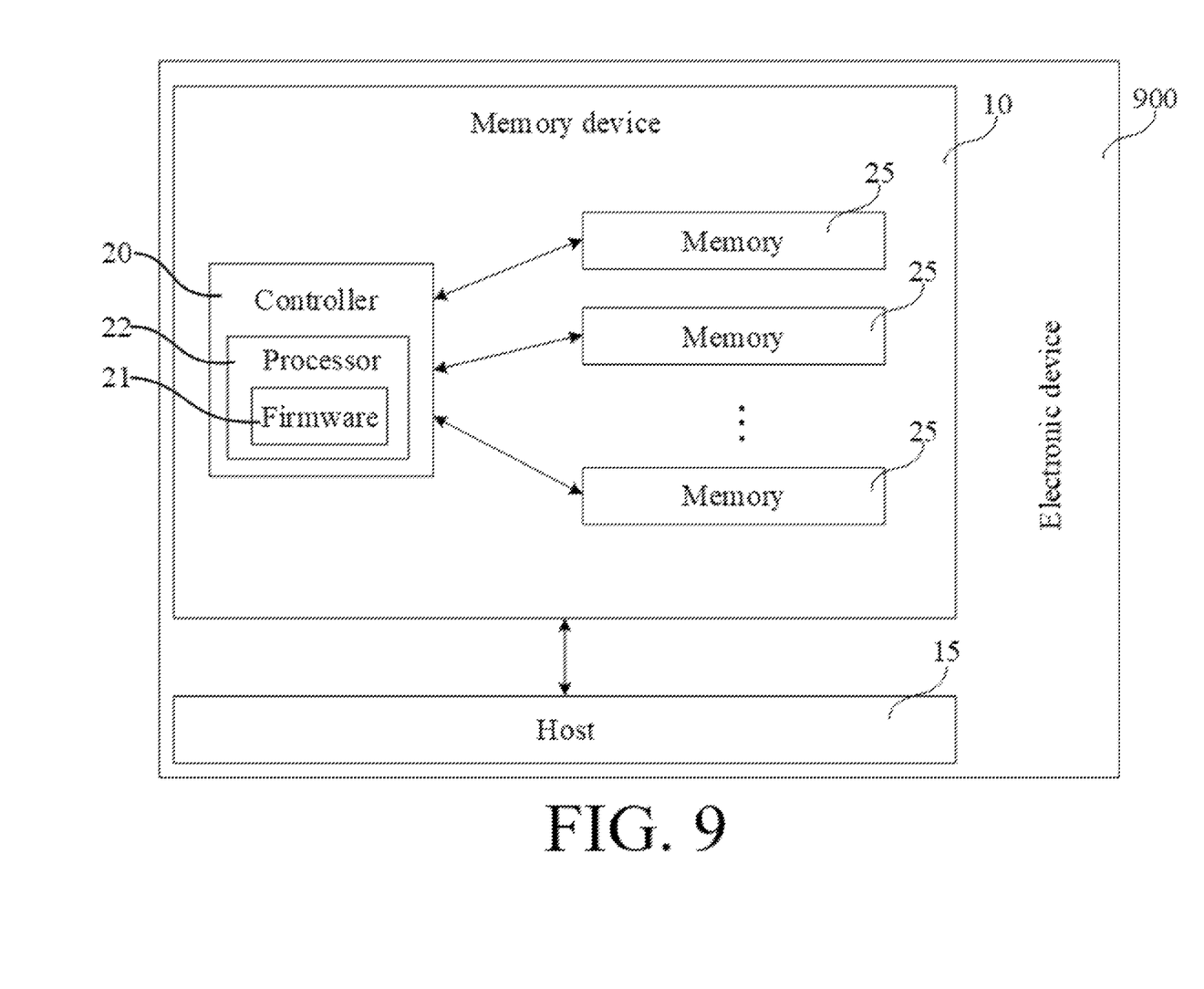
FIG. 9 is a structural block diagram of an electronic device according to an implementation of the present application.

Referring to FIG. 9, which schematically shows a structural block diagram of an electronic device according to an implementation of the present application.

Generally, the electronic device 900 includes: a memory device 10 and a host 15.

The memory device 10 may include a controller 20 and one or more memories 25. The memory device 10 is coupled to a host 15. The controller 20 can run firmware 21, and the firmware 21 can be executed by one or more processors 22 (e.g., microcontroller unit, CPU) of the controller 20 to implement the above-mentioned method of operating the memory controller.

For the specific introduction of the specific structure of the memory device 10 and the host 15 and the interaction between them, reference may be made to the above implementations, and details are not repeated here.

In some implementations, a computer-readable storage medium is further provided, and a computer program is stored in the storage medium. The computer program is loaded and executed by the memory device to implement the above-mentioned method of operating the memory controller.

In some examples, the computer-readable storage medium may include: ROM, RAM, Solid State Drives (SSD) or optical disc, and the like. Among them, the RAM may include Resistance Random Access Memory (ReRAM) and Dynamic Random Access Memory (DRAM).

The "plurality" mentioned herein means two or more. "And/or" describes the association relationship of associated objects, indicating that there may be three types of relationships. For example, A and/or B may indicate: A alone, both A and B, and B alone. The character Symbol "/" generally indicates that the contextual objects are in an "or" relationship.

Implementations of the present application provide a method of operating a memory controller, an apparatus, a device, and a storage medium. The technical solution provided by the implementations of the present application is as follows.

According to an aspect of an implementation of the present application, there is provided a method of operating a memory controller, the controller is coupled to a memory, and the method includes:

acquiring respective lifetimes of at least two partitions included in the memory, the lifetimes of the partitions being related to wear levels of the partitions;

determining a target partition from the at least two partitions based on the respective lifetimes of the at least two partitions; and selecting a block from the target partition as a temporary block, the temporary block to store fragmented data.

According to an aspect of an implementation of the present application, there is provided a controller, the controller includes an internal memory, and a processor coupled to the internal memory, the processor is configured to run firmware to implement the above-mentioned method of operating a memory controller.

According to an aspect of an implementation of the present application, there is provided a memory device, the memory device includes a controller and at least one memory coupled to the controller, the controller is configured to run firmware to implement the above-mentioned method of operating a memory controller.

According to an aspect of the implementations of the present application, there is provided an electronic device, the electronic device includes a host and a memory device coupled to the host, the memory device includes a controller and at least a memory coupled to the controller, the controller is configured to run firmware to implement the above-mentioned method of operating a memory controller.

According to an aspect of the implementations of the present application, there is provided a computer-readable storage medium, a computer program is stored in the computer-readable storage medium, and the computer program is configured to be executed by a memory device to implement the above-mentioned method of operating a memory controller.

The technical solutions provided in the implementations of the present application can achieve the following technical effects.

The target partition is determined from the at least two partitions according to the respective lifetimes of the at least two partitions included in the memory, and then the temporary block used for storing the fragmented data is selected from the target partition. Excessive wear to a certain fixed partition in the memory caused by setting the temporary block is avoided, thereby improving the service life of the memory.

The above are only optional implementations of the application, and are not intended to limit the application. Any modifications, equivalent replacements, improvements and the like made within the spirit and principles of the application shall be encompassed within the protection scope of the application.

What is claimed is:

1. A method of operating a memory controller, wherein the memory controller is coupled to a memory, the method comprising:

acquiring respective lifetimes of at least two partitions included in the memory, the respective lifetimes of the partitions to correspond to a wear ratio of each of the partitions, the wear ratio based on a number of times data is erased and written in a partition of the at least two partitions compared to a threshold number of times of performance of erasure and write operations for the partition;

determining a target partition from the at least two partitions based on the respective lifetimes of the at least two partitions; and selecting a block from the target partition as a temporary block, the temporary block to store fragmented data, wherein the fragmented data corresponds to an amount of data of a size that is written into a portion of a page of the temporary block, wherein the temporary block includes a whole number of pages, the page includes a data area and a metadata area, and wherein the fragmented data is written into the data area to correspond to the portion of the page less than an entire page.

2. The method according to claim 1, wherein the determining the target partition from the at least two partitions based on the respective lifetimes of the at least two partitions includes determining a first partition among the at least two partitions as the target partition, wherein the first partition has a smaller lifetime than a second partition.

3. The method according to claim 1, wherein the selecting the block from the target partition as the temporary block includes:

acquiring lifetimes of individual blocks included in the target partition, the lifetimes of the individual blocks being related to wear levels of the individual blocks; and determining the block whose lifetime satisfies a condition among the individual blocks included in the target partition as the temporary block.

4. The method according to claim 3, wherein the determining the block whose lifetime satisfies the condition among the individual blocks included in the target partition as the temporary block includes:

determining a first block among the individual blocks included in the target partition as the temporary block based on the first block having a smaller lifetime than a second block; or determining any block whose lifetime is smaller than a preset value among the individual blocks included in the target partition as the temporary block.

5. The method according to claim 1, wherein the at least two partitions are divided based on a storage mode adopted by individual blocks in the memory.

6. The method according to claim 1, wherein, after selecting the block from the target partition as the temporary block, the method further includes writing data into the temporary block by using a single-level cell (SLC) mode.

7. The method according to claim 1, wherein, after selecting the block from the target partition as the temporary block, the method further includes, when stored data in the temporary block reaches a set amount, writing the set amount of the stored data into a current block of a memory, the current block to store non-fragmented data, wherein the set amount corresponds to an amount of data to fill the data area, and the non-fragmented data is stored corresponding to the set amount in the current block.

8. The method according to claim 7, wherein the set amount is related to a quantity of the memory.

9. The method according to claim 7, wherein
the memory includes a plurality of memories; and
writing the set amount of the stored data into the current block of the memory includes, after the set amount of the stored data is evenly divided, writing the stored data into current blocks of the plurality of memories, wherein evenly dividing the set amount of the stored data includes dividing the stored data between a first current block and a second current block, and wherein the first current block and the second current block store a same amount of the stored data.

10. A controller, comprising:
an internal memory; and a processor coupled to the internal memory, the processor being configured to run firmware to implement a method of operating the controller, wherein the controller is coupled to a memory, the method including:

acquiring respective lifetimes of at least two partitions included in the memory, the respective lifetimes of the partitions to correspond to a wear ratio of each of the partitions, the wear ratio based on a number of times data is erased and written in a partition of the at least two partitions compared to a threshold number of times of performance of erasure and write operations for the partition;

determining a target partition from the at least two partitions based on the respective lifetimes of the at least two partitions; and selecting a block from the target partition as a temporary block, the temporary block to store fragmented data, wherein the fragmented data corresponds to an amount of data that is written into a portion of a page of the temporary block, wherein the temporary block includes a whole number of pages, the page includes a data area and a metadata area, and wherein the fragmented data is written into the data area to correspond to the portion of the page less than an entire page.

11. A memory device, comprising:

a controller configured to run firmware to implement a method of operating the controller; and a memory coupled to the controller, wherein the method includes:

acquiring respective lifetimes of at least two partitions included in the memory, the respective lifetimes of the partitions to correspond to a wear ratio of each of the partitions, the wear ratio based on a number of times data is erased and written in a partition of the at least two partitions compared to a threshold number of times of performance of erasure and write operations for the partition;

determining a target partition from the at least two partitions based on the respective lifetimes of the at least two partitions; and selecting a block from the target partition as a temporary block, the temporary block to store fragmented data, wherein the fragmented data corresponds to an amount of data that is written into a portion of a page of the temporary block, wherein the temporary block includes a whole number of pages, the page includes a data area and a metadata area, and wherein the fragmented data is written into the data area to correspond to the portion of the page less than an entire page.

12. The memory device of claim 11, wherein the determining the target partition from the at least two partitions based on the respective lifetimes of the at least two partitions includes determining a first partition among the at least two partitions as the target partition, wherein the first partition has a smaller lifetime than a second partition.

13. The memory device of claim 11, wherein the selecting the block from the target partition as the temporary block includes:

acquiring lifetimes of individual blocks included in the target partition, the lifetimes of the individual blocks being related to wear levels of the individual blocks; and determining the block whose lifetime satisfies a condition among the individual blocks included in the target partition as the temporary block.

14. The memory device of claim 13, wherein the determining the block whose lifetime satisfies the condition among the individual blocks included in the target partition as the temporary block includes:

determining a first block among the individual blocks included in the target partition as the temporary block based on the first block having a smaller lifetime than a second block; or determining any block whose lifetime is smaller than a preset value among the individual blocks included in the target partition as the temporary block.

15. The memory device of claim 11, wherein the at least two partitions are divided based on a storage mode adopted by individual blocks in the memory.

16. The memory device of claim 11, wherein, after selecting the block from the target partition as the temporary block, the method further includes writing data into the temporary block by using a single-level cell (SLC) mode.

17. The memory device of claim 11, wherein, after selecting the block from the target partition as the temporary block, the method further includes, when stored data in the temporary block reaches a set amount, writing the set amount of the stored data into a current block of a memory, the current block to store non-fragmented data, wherein the set amount corresponds to an amount of data to fill the data area, and the non-fragmented data is stored corresponding to the set amount in the current block.

18. The memory device of claim 17, wherein the set amount is related to a quantity of the memory.

19. The memory device of claim 17, wherein the memory includes a plurality of memories, and writing the set amount of the stored data into the current block of the memory includes, after the set amount of the stored data is evenly divided, writing the stored data into current blocks of the plurality of memories, wherein evenly dividing the set amount of the stored data includes dividing the stored data between a first current block and a second current block, and wherein the first current block and the second current block store a same amount of the stored data.

20. The controller of claim 10, wherein the determining the target partition from the at least two partitions based on the respective lifetimes of the at least two partitions includes determining a first partition among the at least two partitions as the target partition, wherein the first partition has a smaller lifetime than a second partition.

* * * * *